United States Patent [19]

Martinez et al.

[11] 4,420,687
[45] Dec. 13, 1983

[54] NON-DISPERSIVE INFRARED GAS ANALYZER

[75] Inventors: Mark S. Martinez, San Gabriel; Harold W. Pust, Huntington Beach, both of Calif.

[73] Assignee: Teledyne Industries, Inc., Los Angeles, Calif.

[21] Appl. No.: 437,486

[22] Filed: Oct. 28, 1982

[51] Int. Cl.$^3$ .............................................. G01J 1/00
[52] U.S. Cl. ................................... 250/343; 250/345; 356/437
[58] Field of Search ............... 250/338, 343, 345, 349, 250/350, 351; 356/51, 436, 437, 440

[56] References Cited

U.S. PATENT DOCUMENTS

3,219,642 11/1965 Killpatrick ........................ 250/351
4,008,394 2/1977 Risgin et al. ...................... 250/345
4,101,221 7/1978 Schunck et al. .................. 250/351
4,306,152 12/1981 Ross et al. ......................... 250/345

Primary Examiner—Janice A. Howell
Attorney, Agent, or Firm—Reagin & King

[57] ABSTRACT

An improved non-dispersive infrared gas analyzer is disclosed in which beams of infrared energy are passed through cells containing a reference gas, and a sample gas to be analyzed. The relative absorption of the infrared energy by the gases is measured by a detector and used as an indication of gas concentration. A novel optical system is employed which shapes the beams entering and exiting the cells in a manner which ensures that the waveforms of the resultant beams striking the detector from the measurement and reference cells are identical. A novel electronic control system is disclosed which periodically and automatically adjusts the zero reference level of the analyzer.

8 Claims, 12 Drawing Figures

NON-DISPERSIVE INFRARED GAS ANALYZER

BACKGROUND OF THE INVENTION

This invention relates to gas analyzers and more particularly, to an improved non-dispersive infrared gas analyzer for providing accurate and repeatable measurements of gas concentrations over long periods of time.

A wide variety of non-dispersive infrared gas analyzers have been developed over the years for measuring gas concentrations in automobile emission and medical applications. Examples of such analyzers are disclosed in U.S. Pat. No. 3,932,754 issued Jan. 13, 1976, to Max. J. Riedl and Thaddeus C. Ross; and U.S. Pat. No. 4,069,420, issued Jan. 17, 1978, to Thaddeus C. Ross.

One characteristic of the types of applications mentioned above is that they require gas concentration measurements over only a short interval of time. For example, auto emissions measurements are performed typically over a time interval of only a few minutes, and measurements of gas concentrations in medical applications are performed typically over a time interval of an hour or less.

While many of the prior art gas analyzers are designed to provide accurate measurements during a single measurement interval, they generally require periodic recalibration by a skilled operator to ensure the accuracy of subsequent measurements.

A recent application for gas analyzers is the continuous measurement of gas concentrations in combustion flue gases. Such measurements are used typically to monitor industrial processes over very long intervals of time extending from days to weeks. A requirement of this type of application is that the analyzer must be capable of maintaining accurate gas concentration measurements over long intervals of time without the need for operator intervention.

It has been found that prior art gas analyzers are unsuitable for use in unattended long term measurement applications such as that described above because such analyzers are not capable of maintaining the required accuracy over long intervals of time without the need for periodic manual recalibration.

Accordingly, it is an object of the present invention to provide a new and improved gas analyzer.

It is another object of the present invention to provide accurate gas measurements over long periods of time.

It is another object of the present invention to provide automatic recalibration of a gas analyzer without the need for operator intervention.

SUMMARY OF THE INVENTION

The foregoing and other objections of the invention are accomplished by a non-dispersive infrared gas analyzer including a radiation source for providing a directed beam of infrared energy, and generally cylindrical reference and measurement cells having substantially identical inner diameters. These cells are used for containing, respectively, a reference gas, and a sample gas to be analyzed. A rotating disk is provided having circumferentially spaced-apart inner and outer sets of generally arcuate-shaped apertures. First and second baffles are provided each having first and second circular apertures where the diameter of both of the first circular apertures is equal to the inner diameter of the cells and the diameter of both of the second apertures is less than the inner diameter of the cells. An infrared detector is also provided for measuring the radiation from two beams of infrared energy.

The rotating disk is positioned with respect to the radiation source so that the rotation of the disk in conjunction with its inner and outer sets of apertures acts to interrupt the directed beam to produce, respectively, first and second sequentially pulsed beams of infrared energy. The first and second pulsed beams are directed axially through the second and first circular apertures of the first baffle, respectively, and then through one end of the reference and measurement cells, respectively. The radiation beams subsequently emanating from the other end of the reference and measurement cells are directed through the first and second circular apertures, respectively, of the second baffle, and then to the infrared detector.

A portion of the infrared energy passing through each cell is absorbed by the gas within that cell, and the level of absorption is proportional to the type of gas and to the concentration of that gas within the cell. Accordingly, the amount of infrared energy appearing at the detector from the beams passing through the cells is a measure of the gas concentration in those cells.

The infrared detector produces an electrical signal in the form of a pulse train comprised of reference pulses alternating with measurement pulses. The amplitude of each reference pulse is proportional to the amount of infrared energy appearing at the detector from the first pulsed beam passing through the reference cell. In like manner, the amplitude of each measurement pulse is proportional to the amount of infrared energy appearing at the detector from the second pulsed beam passing through the measurement cell.

From the above discussion, it may be seen that the amplitude of the reference and measurement pulses is proportional to the gas concentrations in the reference and measurement cells, respectively. The difference in amplitude between reference and measurement pulses is a measure of the relative gas concentration in the measurement cell with respect to the gas concentration in the reference cell. The analyzer includes analog circuitry for subtracting the measurement pulses from the reference pulses, and for filtering, linearzing and displaying the resultant signal to provide a direct indication of the relative gas concentration in the measurement cell.

To provide accurate and repeatable measurements of gas concentration, it has been found that the waveshape of the measurement pulse should be the same as the waveshape of the reference pulse. Further, to provide an accurate zero base reference for the measurements, it is necessary that the amplitude of the measurement pulse be equal to the amplitude of the reference pulse when the measurement and reference cells contain identical gases.

The analyzer includes a novel optical system which shapes the beams of infrared energy entering and exiting the cells in a manner which ensures that the waveshapes of the measurement and reference pulses are identical. This is accomplished by establishing particular interrelationships between the dimensions of the rotating disk arcuate apertures, the dimensions of the baffle apertures, the inner diameter of the cells and the relative positions on the disk surface of the arcuate apertures.

The analyzer also includes a novel electronic control system which periodically and automatically adjusts the amplitude of the measurement pulse equal to the amplitude of the reference pulse with the measurement and reference cells containing identical gases. This automatic zeroing feature is fully automatic and requires no operator intervention for its operation.

These and other objects, features and advantages of the invention will become apparent by reference to the specification taken in conjunction with the drawings in which like elements are referred to by like reference designations throughout the several views.

DESCRIPTION OF THE PREFERRED EMBODIMENT

OPTICAL SYSTEM

Figure 1:
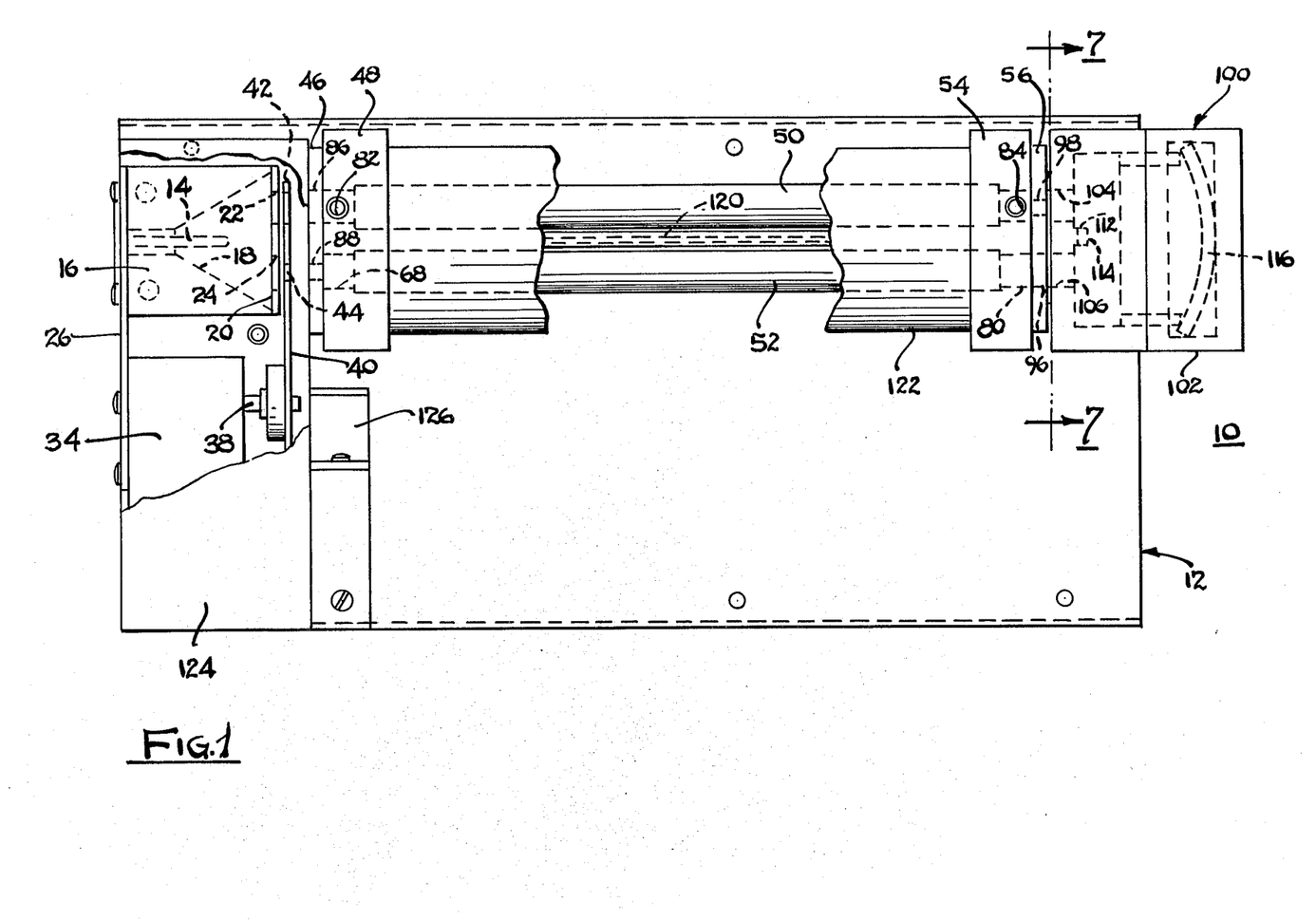
FIG. 1 is a top view of the analyzer constructed in accordance with the present invention, partially cut away to show the radiation source, interruptor disk, and measurement and reference cells.

Referring to FIG. 1 there is shown a nondispersive infrared gas analyzer 10 constructed in accordance with the present invention. The analyzer 10 includes a mounting plate 12 which supports an infrared source 14 mounted within a reflector block 16 (more clearly shown in FIG. 2). The infrared source 14 projects into a frusto-conical cavity 18 formed within the block 16. A collimating plate 20 having identically sized openings 22 and 24 is affixed to one end of the block 16 and covers the open end of the cavity 18.

Figure 2:
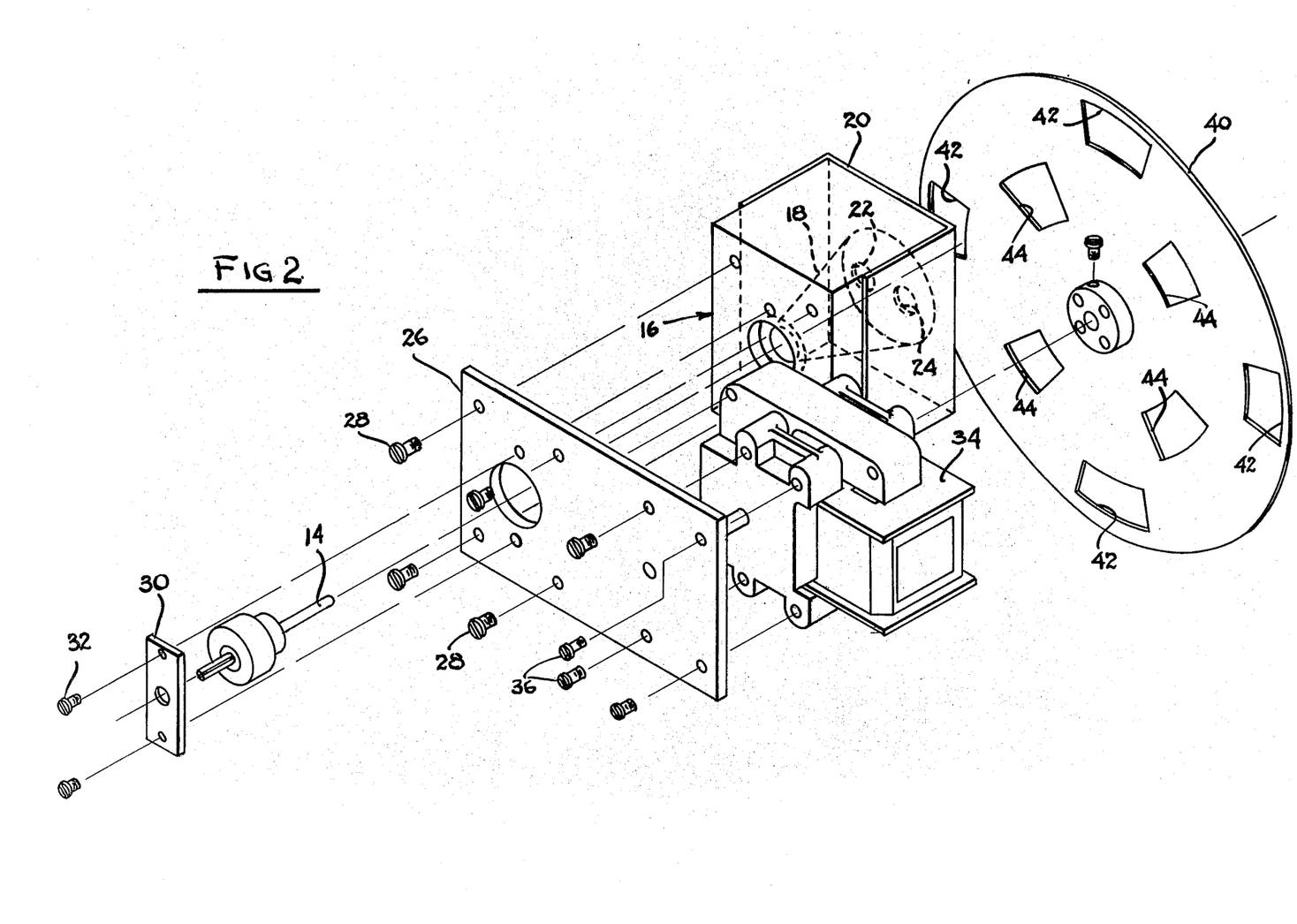
FIG. 2 is an exploded perspective view of the radiation source and interruptor disk portions of the analyzer of FIG. 1.

A mounting bracket 26 is affixed to one end of the reflector block 16 using screws 28 as shown in FIG. 2. The bracket 26 in conjunction with plate 30 and screws 32 serves to support the infrared source 14 within the block 16. The bracket 26 is also used to mount a motor 34 using screws 36. Attached to the motor output shaft 38 is a thin opaque interruptor disk 40. The disk 40 includes a set of four circumferentially spaced apart generally arcuate shaped outer apertures 42 and four circumferentially spaced apart generally arcuate shaped inner apertures 44. The apertures 42 are spaced apart ninety degrees with respect to each other, as are the apertures 44. The apertures 44 are offset forty five degrees with respect to the apertures 42 to form a staggered arrangement. The disk 40 is positioned with respect to the reflector block 16 so that when the disk 40 rotates about its center, the apertures 42 and 44 are sequentially aligned with the openings 22 and 24, respectively, in the collimating plate 20.

A cell assembly including a first baffle 46, a first endplate 48, a measurement cell 50, a reference cell 52, a second endplate 54, and a second baffle 56 is mounted to the plate 12 as shown in FIG. 1. The construction of the cell assembly is described as follows with reference to FIGS. 1, 3, 4, 5 and 6.

Figure 3:
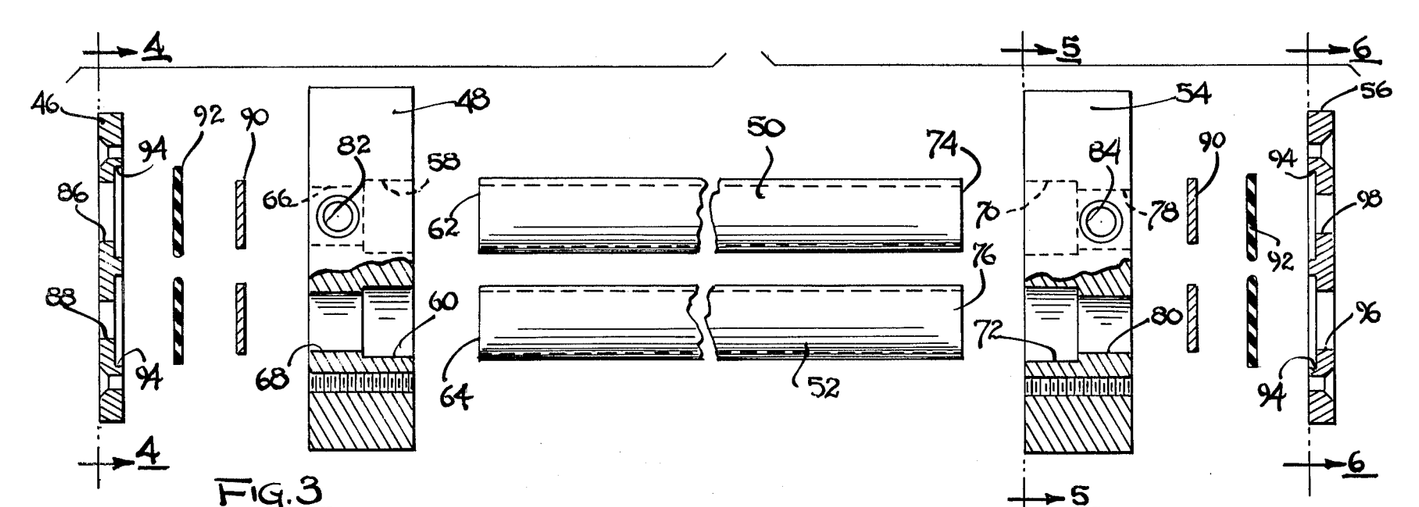
FIG. 3 is an exploded top view of the reference and measurement cell portions of the analyzer of FIG. 1 showing the first and second baffles and the first and second endplates.

The measurement and reference cells 50 and 52 are cylindrical tubes formed of an inert material, such as glass, with the inner diameter of the measurement cell 50 being equal to the inner diameter of the reference cell 52. The measurement cell 50 is designed to contain a sample gas to be analyzed by the analyzer 10 and the reference cell 52 is designed to contain a reference gas.

The cells 50 and 52 are supported at their ends by endplates 48 and 54. The endplate 48 includes recesses 58 and 60 designed to accommodate the first ends 62 and 64, respectively, of the measurement and reference cells 50 and 52. These ends 62 and 64 are held in place within the endplate 48 using an adhesive, such as epoxy. Openings 66 and 68 in endplate 48 extend from one end of endplate 48 to the recesses 58 and 60, respectively. The diameter of both of the openings 66 and 68 is equal to the inner diameter of the cells 50 and 52.

Figure 5:
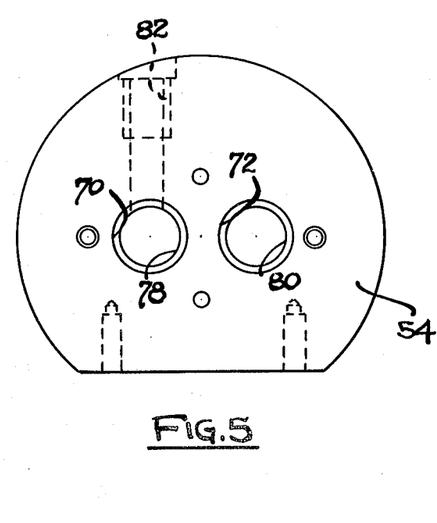
FIG. 5 is an end view of the second endplate as viewed from line 5—5 of FIG. 3.

The endplate 54 is similar in construction to the endplate 48 with recesses 70 and 72 designed to accommodate the second ends 74 and 76, respectively, of the measurement and reference cells 50 and 52. Openings 78 and 80 extend from one end of the endplate 54 to the recesses 70 and 72, respectively. The diameter of both of the openings 78 and 80 is equal to the inner diameter of the cells 50 and 52. An end view of the endplate 54 is shown in FIG. 5. Endplates 48 and 54 also include openings 82 and 84, respectively, which extend from the top of these endplates to openings 66 and 78, respectively. The openings 82 and 84 act as gas inlets and outlets, respectively, to allow the sample gas to be introduced into and removed from the measurement cell 50.

Figure 4:
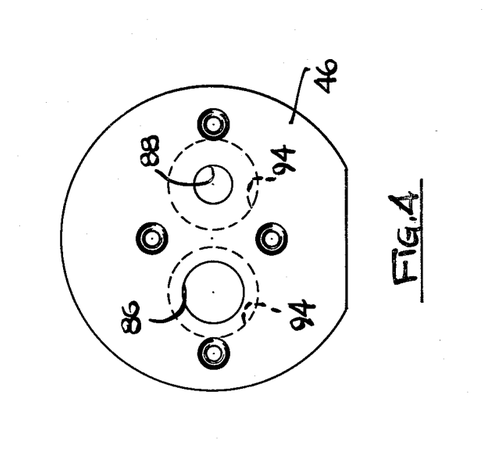
FIG. 4 is an end view of the first baffle as viewed from line 4—4 of FIG. 3.

The open ends of the openings 66 and 68 in the first endplate 48 are provided with gas tight windows using windows 90 formed of an infrared transparent material such as sapphire, and O-ring seals 92. The O-rings 92 fit within recesses 94 in the baffle 46. The baffle 46 is in turn bolted to the endplate 48 (using bolts not shown) which compresses the seals 92 against the windows 90 to form gas tight enclosures. The baffle 46 also includes first and second circular apertures 86 and 88 which are axially aligned with the cells 50 and 52, respectively. An end view of the first baffle 46 is shown in FIG. 4.

Figure 6:
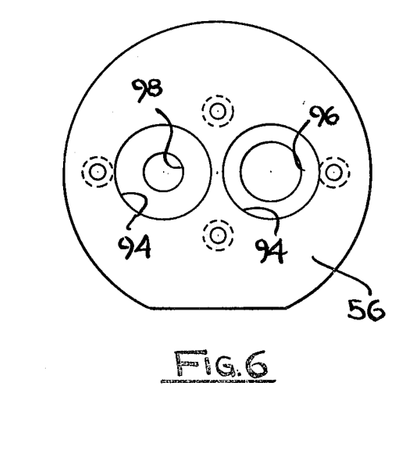
FIG. 6 is an end view of the second baffle as viewed from line 6—6 of FIG. 3.

In a similar manner to that described above, gas tight windows are provided for the openings 78 and 80 in the second endplate 54 using windows 90 and seals 92 in cooperation with the second baffle 56 which is bolted (using bolts not shown) to the second endplate 54. The second baffle 56 is substantially identical in construction to the first baffle 46 and circular apertures 96 and 98 in baffle 56 are identical in diameter to the apertures 86 and 88 respectively, of the baffle 46. An end view of the baffle 56 is shown in FIG. 6. The cell assembly described above is mounted to the plate 12 so that the apertures 86 and 88 in the baffle 46 are axially aligned with the openings 22 and 24, respectively, in the collimating plate 20, as shown in FIG. 1.

An infrared detector assembly 100 is also mounted to the plate 12. The assembly 100, shown in detail in FIGS. 7 and 8, includes a generally cylindrical housing 102. Cylindrical openings 104 and 106 are provided in a front end 107 of the housing 102 where the diameter of the openings 104 and 106 is equal to the inner diameter of the cells 50 and 52. The openings 104 and 106 are sealed using infrared transparent windows 108 and 110, respectively. The windows 108 and 110 are positioned in recesses provided in the front end 107 of the housing 102 and are held in place using a suitable adhesive, such as epoxy.

Figures 7, 8, 10:
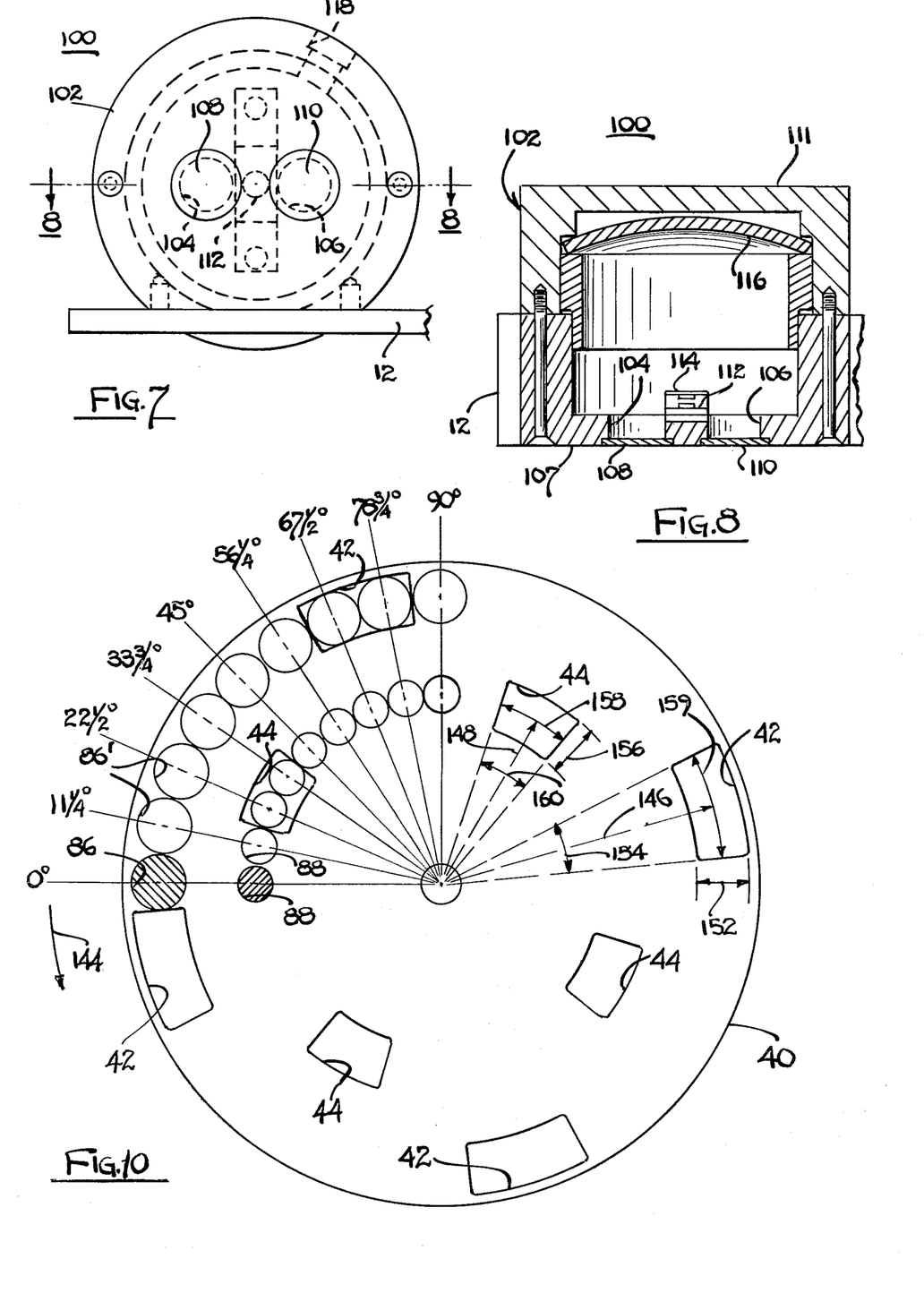
FIG. 7 is an end view of the infrared detector portion of the analyzer shown in FIG. 2 as viewed from line 7—7 of FIG. 1.
FIG. 8 is a top cross-sectional view of the detector shown in FIG. 7 taken along the line 8—8 of FIG. 7.
FIG. 10 is an end view of the interruptor disk showing the relative positions of the circular apertures in the first baffle over ninety degrees of rotation of the disk.

Mounted between the openings 104 and 106 and facing a rear end 111 of the housing 102 is a solid state infrared detector 112 which may be formed of a material such as lead sulphide. A narrow-band infrared filter 114 is mounted over the detector 112 and restricts the sensitivity of the detector 112 to the wavelength of the infrared energy absorbed by the sample gas. A curved infrared reflector 116 is mounted along the rear end 111 of the housing 102 and is shaped so that infrared energy entering the housing 102 through either the opening 104 or 106 is reflected to and focused on the filter 114 and the detector 112. The detector 112 generates an electrical signal on output conductors (not shown) in response to infrared energy impinging on the surface of the detector 112. The conductors from the detector 112 are routed to a suitable electrical connector 118 communicating with the exterior of the housing 102. The detector assembly 100 is positioned on the mounting plate 12 so that the openings 104 and 106 in the housing 102 are axially aligned with the apertures 98 and 96, respectively, in the second baffle 56 as shown in FIG. 1.

The analyzer 10 of the present invention also includes an electrical heating element 120 positioned between the cells 50 and 52 which is in turn covered with a thermal insulating material 122. The heating element 120 maintains the temperature of the cells 50 and 52 at a predetermined temperature level. A protective cover 124 is provided over the reflector block 16, the motor 34, and the interruptor disk 40.

A position sensor 126 is mounted adjacent the interruptor disk 40 and provides an electrical signal which indicates the rotational position of the disk 40. In the preferred embodiment of the invention, the sensor 126 employs a light source such as a light emitting diode and a photodetector such as a phototransistor. Reflective material is placed on the surface of the disk 40 at predetermined positions and acts to reflect light from the light emitting diode to the photo detector at preselected rotational positions of the disk 40. Optical position sensors of this type are well known to those skilled in the art.

Figure 9:
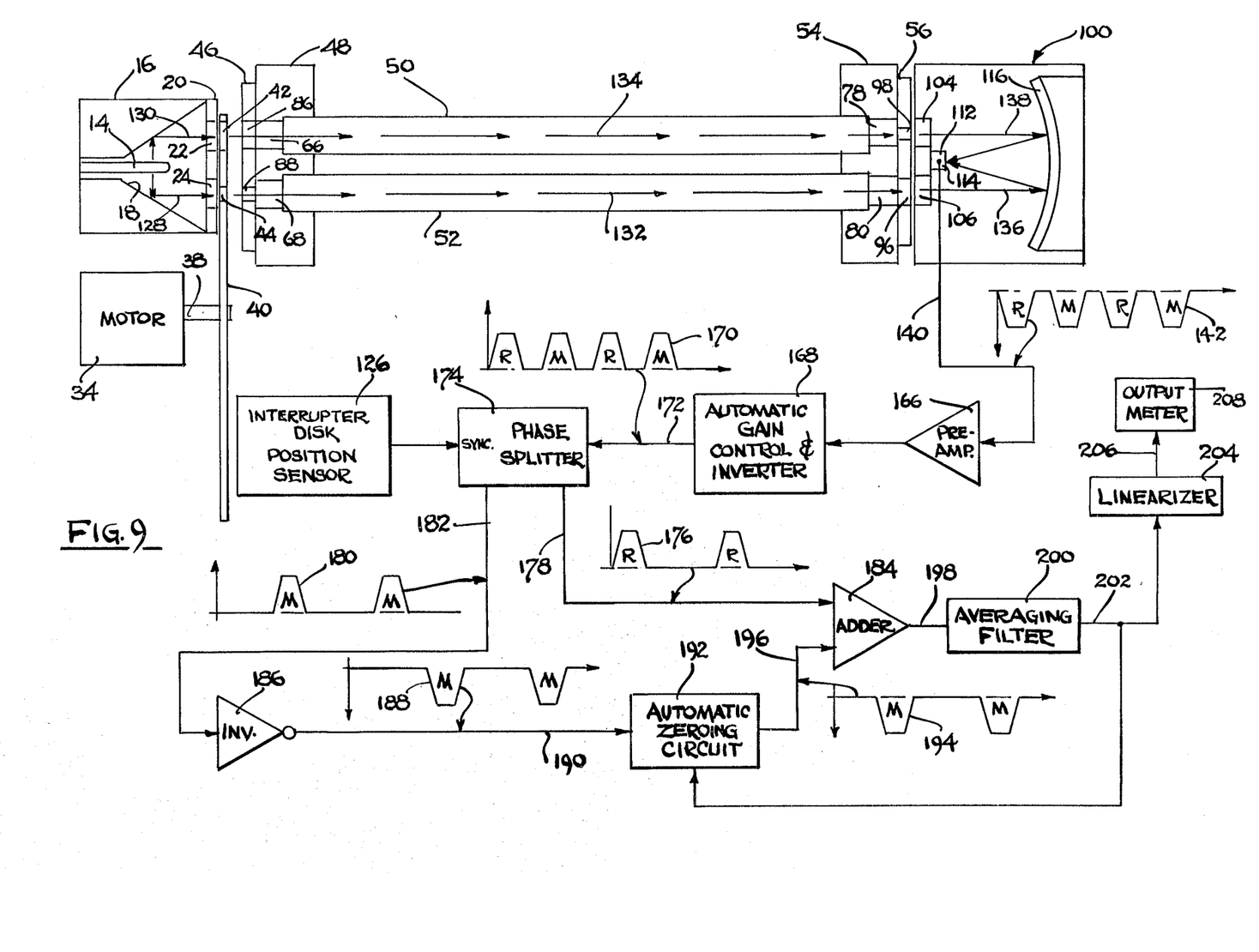
FIG. 9 is a schematic/block diagram of the analyzer of the present invention showing the electronic control system.

The operation of the analyzer 10 described thus far is as follows. Referring to FIG. 9, there is shown a schematic diagram of the optical portion of the analyzer 10 combined with a block diagram of the electronic control portion of the analyzer 10. The arrows shown in the schematic portion of FIG. 9 depict the paths of infrared energy discussed in detail below.

When electrical power is provided to the analyzer 10, the motor 34 causes the disk 40 to rotate at a constant speed, and the infrared source 14 is caused to radiate infrared energy within the cavity 18. For purposes of discussion, it is presumed that the reference and measurement cells 52 and 50 are both filled with a reference gas such as air.

As discussed above, the measurement cell 50 and the reference cell 52 are configured to have identical dimensions of inner diameter, hereinafter referred to as the dimension 'D'. The infrared energy radiating from the source 14 is reflected by the wall of the frusto-conical cavity 18 and exits reflector block 16 through openings 24 and 22 in the form of first and second directed beams 128 and 130, respectively. The diameter of the openings 22 and 24 is equal to the diameter D. The beams 128 and 130 are blocked by the opaque portions of the interruptor disk 40 and may pass through the disk 40 only when the inner and outer apertures 44 and 42 of the disk 40 pass in front of the openings 24 and 22, respectively. As shown in FIG. 2, the apertures 44 are staggered with respect to the apertures 42. Thus, as the disk 40 rotates the effect is to produce sequentially pulsed beams of infrared energy.

Returning to FIG. 9, when an inner aperture 44 of the disk 40 passes in front of the opening 24, a first pulsed beam 132 is produced; and as an outer aperture 42 passes in front of the opening 22, a second pulsed beam 134 is produced. The first pulsed beam 132 passes through the second circular aperture 88 in the first baffle 46 and then through the opening 68 in the first endplate 48. The pulsed beam 132 then travels along the length of the reference cell 52, passes through the opening 80 in the second endplate 54 and then passes through the circular aperture 96 in the second baffle 56. The resultant beam, indicated as 136 in FIG. 9, enters the detector assembly 100 through opening 106, is reflected by the curved reflector 116, and impinges on the infrared detector 112 through the filter 114.

In like manner, the second pulsed beam 134, created when an outer aperture 42 passes in front of the opening 22, enters measurement cell 50 through the aperture 86 in the first baffle 46 and the opening 66 in the first endplate 48. The pulsed beam 134 exits the measurement cell 50 through the opening 78 in the second endplate 54 and the aperture 98 in the second baffle 56. The resultant beam, indicated as 138 in FIG. 9, enters the detector assembly 100 through the opening 104, is reflected by reflector 116, and impinges on the detector 112 through the filter 114.

The infrared detector 112 produces an electrical signal, the magnitude and waveshape of which is proportional to the magnitude and waveshape of the infrared energy impinging on the surface of the detector 112. The output signal from the detector 112 appears on line 140 and has a waveform 142 as shown in FIG. 9. The waveform 142 consists of a series of reference pulses labeled 'R' alternating with measurement pulses labeled 'M'. The reference pulses are produced in response to the pulsed beam of infrared energy 136 and the measurement pulses are produced in response to the pulsed beam of infrared energy 138. Each of the reference pulses is produced by one of the inner apertures 44 of the disk 40 passing in front of the opening 24. Similarly each of the measurement pulses is produced by one of the outer apertures 42 passing in front of the opening 22. Since the disk 40 contains four inner apertures 44 and four outer apertures 42, one complete revolution of the disk 40 produces four reference pulses alternating with four measurement pulses.

A portion of the infrared energy passing through each of the cells 50 and 52 is absorbed by the gas within that particular cell, where the level of absorption is proportional to the type of gas and to the concentration of that gas within the cell. Accordingly, the amount of infrared energy appearing at the detector 112 from the beams passing through the cells 50 and 52, is a measure of the gas concentration in those cells. Since the amplitude of the electrical signal produced by the detector 112 is proportional to the amount of infrared energy impinging on that detector 112, it may be seen that the amplitude of the reference and measurement pulses in the waveform 142 is proportional to the gas concentrations in the reference and measurement cells 52 and 50, respectively. Further, the difference in amplitude between the reference and sample pulses is a measure of the relative gas concentration in the sample cell 50 with respect to the gas concentration in the reference cell 52.

To provide accurate and repeatable measurements of gas concentration, it has been found that the waveshape of the measurement pulse should be the same as the waveshape of the reference pulse. Further, to provide an accurate zero-base reference for the gas concentration measurements, it is necessary that the amplitude of the measurement pulse be equal to the amplitude of the reference pulse when the measurement and reference cells 52 and 50 contain identical gases.

In the analyzer 10 of the present invention, the shapes of the beams of infrared energy entering and exiting the cells 50 and 52 are controlled by the shapes and dimensions of the arcuate apertures 42 and 44 of the disk 40 and the circular apertures 86 and 88, and 96 and 98 of the first and second baffles 46 and 56. In particular, to ensure that the waveshape of the measurement pulse is the same as the waveshape of the reference pulse, it has been found that the dimensions of the apertures 42, 44, 86, 88, 96 and 98 must be determined with relation to the diameter D and to the relative positions on the surface of the disk 40 of the apertures 42 and 44. The folllowng is a detailed discussion of the inter-relationships between these various apertures with reference to FIG. 10.

FIG. 10 is an end view of the disk 40 as seen from the collimating plate 20. Superimposed on the disk 40 are the outlines of the apertures 86 and 88 in the first baffle 46. The shaded pair of circles in FIG. 10 show the true position of the apertures 86 and 88 with the disk 40 rotated to a reference position indicated as zero degrees. The unshaded pairs of circles 86' and 88' show the apparent positions of the apertures 86 and 88 with respect to the disk 40 as it rotates over a span of 90° in the direction shown by arrow 144. The angular rotation of the disk 40 corresponding to each of the pairs of circles 86' and 88' is indicated by the various degree markings shown in FIG. 10.

Each of the arcuate shaped outer apertures 42 is circumferentially located on the disk 40 so that the center of each of the apertures 42 is positioned at a first radius 146 from the center of the disk 40. Referring to FIGS. 1 and 9, it can be seen that the first radius 146 is equal to the distance between the centerline of the shaft 38 of the motor 34 and the centerline of the aperture 86 in the first baffle 46. Each of the arcuate shaped inner apertures 44 are circumferentially positioned on the disk 40 where the center of each aperture 44 is positioned at a second radius 148 from the center of the disk 40, wherethe second radius 148 is less than the first radius 146. Referring again to FIG. 9, it can be seen that the second radius 148 is equal to the distance between the centerline of the shaft 38 of the motor 34 and the centerline of the aperture 88 in the first baffle 46.

The length 150 across the center of each outer aperture 42 is set equal to an integer multiple of the diameter D. In the preferred embodiment, the length 150 is set equal to twice the diameter D. The width 152 of each outer aperture 42 is set equal to the diameter D.

The width 156 of each inner aperture 44 is set equal to the width 152 of the outer aperture 42 which, as stated before, is the same as the diameter D. The length 150 and the radius 146 dictate that each outer aperture 42 subtend a central angle 154 of the disk 40. The length 158 of each inner aperture 44 is set so that each aperture 44 subtends a central angle 160 which is equal to the central angle 154 subtended by each outer aperture 42.

The diameter of the apertures 86 and 96 in the first and second baffles 46 and 56, respectively is set equal to the diameter D. The diameter of the apertures 88 and 98 in the first and second baffles 46 and 56, respectively, is set equal to the diameter D multiplied by the ratio of the second radius 148 to the first radius 146.

It can be shown from the above criteria for establishing the diameter of the apertures 88 and 96 and the criteria for establishing the length 158 of the aperture 44 that the length 158 is an integer multiple of the diameter of the aperture 88, where the intege multiple is the same integer multiple chosen to establish the length 150 of the aperture 42. Thus, with the length 150 set equal to twice the diameter D, the length 158 will correspond to twice the diameter of the aperture 88.

The following example illustrates the various dimensional relationships described above. in the preferred embodiment of the present invention, the diameter D is established as one half inch. Accordingly, the length 150 of the aperture 42 is one inch and the width 152 of that aperture is one half inch. The apertures 42 are each positioned at a radius 146 of approximately 2.63 inches and subtend a central angle 154 of 22¼°. Each inner aperture 44 has a width 156 of one half inch and is positioned at a second radius 148 of approximately 1.64 inches from the center of the disk 40. Each inner aperture 44 subtends the central angle 160 which is equal to the central angle 154, or 22¼°. The resultant length 158 of the aperture 44 is approximately 0.62 inches. The apertures 86 and 96 are each one half inch in diameter and the apertures 88 and 98 have a resultant diameter of approximately 0.31 inches.

Figure 11:
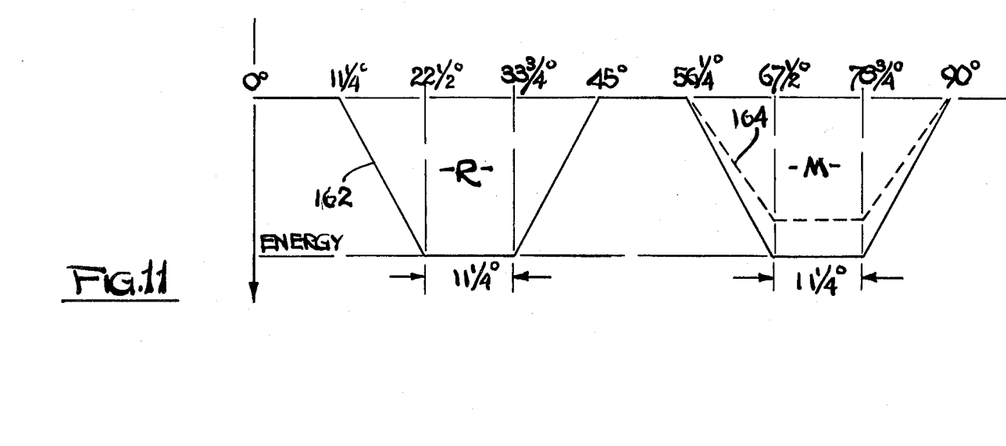
FIG. 11 is a graphic illustration of the first and second pulsed beams of infrared energy produced by the analyzer of the present invention as a function of the rotation of the disk shown in FIG. 10.

Solid line 162 in FIG. 11 illustrates the waveshape of the pulsed beams of infrared energy 136 and 138 entering the detector assembly 100 as the disk 40 rotates from the reference position of zero degrees to the position of ninety degrees, indicated in FIG. 10. The trapezoid-shaped area of the curve in FIG. 11 indicated as 'R', represents the waveshape of the pulsed beam 136 produced as an aperture 44 passes in front of the aperture 88. The trapezoid-shaped area indicated as 'M' in FIG. 11 represents the waveshape of the pulsed beam 138 produced when an aperture 42 passes in front of the aperture 86. It should be noted that the width of the pulsed beam R at its widest and narrowest points is equal to the corresponding width of the pulsed beam M. Further, under the condition that the measurement and reference cells contain identical gases, the amplitude of the beam R is substantially equal to the amplitude of the beam M. Since the detector 112 produces a signal proportional to the infrared energy striking it, the waveshape 162 of FIG. 11 is reproduced by the detector 112 as the electrical waveshape 142 of FIG. 9.

The criteria for establishing the diameter of the apertures 88 and 98 result in these apertures having a diameter less than the diameter D. Accordingly, as shown in FIG. 9, the aperture 88 acts to restrict the amount of infrared energy entering the reference cell 52 and the aperture 98 acts to restrict the amount of energy exiting the sample cell 50. While these apertures 88 and 98 are used to ensure that the waveshape of the reference and sample pulses are identical, the aperture 98 serves another function as well. During the operation of the analyzer 10, the measurement cell 50 is used to contain a sample gas to be analyzed. This gas may contain a variety of elements including water vapor. In prior art analyzers, it has been found that particles such as water vapor collect along the inside surface of the measurement cell 50 and cause infrared reflections and scattering adjacent this surface which result in measurement errors.

In the present invention, the reducing aperture 98 limits the amount of infrared energy entering the detector assembly 100 to the energy travelling along the central portion of the measurement cell 50. The aperture 98 thus effectively excludes those portions of the infrared energy beam which contain the unwanted reflections. It has been found that the reducing aperture 98 eliminates the need for extensive cleansing and filtering of the sample gas.

In the discussion of the analyzer 10 thus far, it has been indicated that the reference and measurement pulses appearing on the waveform 142 in FIG. 9 are identical in waveshape and amplitude when both the reference and measurement cells 52 and 50 contain identical gases. In actual practice the measurement cell 50 contains the sample gas to be analyzed. The effect of the sample gas is that it absorbs more infrared energy than the reference gas in the cell 52. The result of this additional absorption is that the amplitude of the measurement pulses is reduced in an amount proportional to the absorption of the energy by the sample gas. An example of such a reduction in amplitude is shown by dotted line 164 in FIG. 11. Note that while the amplitude of the pulsed beam is reduced, the width of the pulsed beam at its widest and narrowest points remains constant.

ELECTRONIC CONTROL SYSTEM

The electronic control system portion of the analyzer 10 operates as follows, with reference to FIG. 9. The waveform 142 appearing on the line 140 is amplified by pre-amplifier 166 as indicated in FIG. 9. The amplified signal is provided as an input signal to an automatic gain control and inverter circuit 168. The circuit 168 maintains the gain of the input signal at a constant level and inverts the polarity of that signal to produce waveform 170 on line 172. The waveform 170 is provided as an input signal to a phase splitter circuit 174 which also receives a synchronizing signal from the position sensor 126. The position sensor 126 is designed as described above to provide a signal representing predetermined rotational orientations of the disk 40. The signal from the position sensor 126 is designed to indicate to the phase splitter circuit 174 when the disk 40 is in a position to produce a reference pulse and when it is in a position to produce a measurement pulse. This information is used by the phase splitter circuit 174 to separate the waveform 170 into a waveform 176 appearing on line 178 which represents the reference pulse portions of the waveform 170. In like manner, the phase splitter 174 provides a waveform 180 on line 182 which represents the measurement pulse portions of the waveform 170.

The waveform 176 is provided as one input signal to an adder 184. The waveform 180 is inverted in polarity by inverter 186 to produce waveform 188 on line 190. The waveform 188 is provided as an input signal to an automatic zeroing circuit 192.

The purpose of the automatic zeroing circuit is to periodically and automatically adjust the amplitude of the measurement pulse waveform 188 so that it is equal in amplitude (although opposite in polarity), to the amplitude of the reference pulse waveform 176 when both the reference and measurement cells 52 and 50 contain identical gases. The operation of the automatic zeroing circuit 192 is described in detail below.

The circuit 192 produces a measurement pulse waveform 194 on line 196 which is provided as a second input signal to the adder 184. Since the reference pulses in the waveform 176 and the measurement pulses in the waveform 194 are opposite in polarity, the effect of adding these two waveforms together results in a signal appearing on line 198 which represents the difference in amplitude between the reference pulses and the measurement pulses.

The signal 198 is provided to an averaging filter 200 the purpose of which is to convert the pulsed signal appearing on the line 198 to a steady state signal appearing on line 202 which represents the average difference in amplitude between the reference pulses and the measurement pulses. This steady state signal represents the amount of absorption of infrared energy by the sample gas relative to the amount of absorption of infrared energy by the reference gas. The signal is provided to a linearizer circuit 204 which converts the absorption signal to a signal representing gas concentration which appears on the line 206. This signal is in turn provided to an output meter or other recording device 208 for displaying the relative concentration of gas within the measurement chamber 50. When the amplitude of the measurement and reference pulses are equal, the analyzer 10 will display a zero relative gas concentration. It is thus important that these amplitudes be equal when both cells 50 and 52 contain identical gases since this is the zero reference condition for the analyzer 10.

AUTOMATIC ZEROING CIRCUIT

In the above description, it was shown that the optical design of the analyzer 10 provides reference and measurement pulses in the waveform 142 which are identical in waveshape and amplitude when the reference and measurement cells 52 and 50 contain identical gases. The criteria for setting the amplitude of the reference and measurement pulses equal is based on the assumption that, with identical gases in the cells 50 and 52, these cells will have identical absorption characteristics. While this is generally true when an analyzer is first constructed, it has been found that with continuous use the sample gases passing through the cell 50 eventually deposit dirt and other contaminants on the windows 90 and 99. These contaminants alter the absorption characteristics of the cell 50 so that with identical gases within the cells 50 and 52, their absorption characteristics are no longer identical. Therefore, the amplitude of the measurement pulses is no longer equal to the amplitude of the reference pulses in the waveform 142. This difference in amplitude represents an error in gas concentration measurements. This is so because such measurements are based on a zero reference occurring when identical gases are introduced into the cells 50 and 52.

Figure 12:
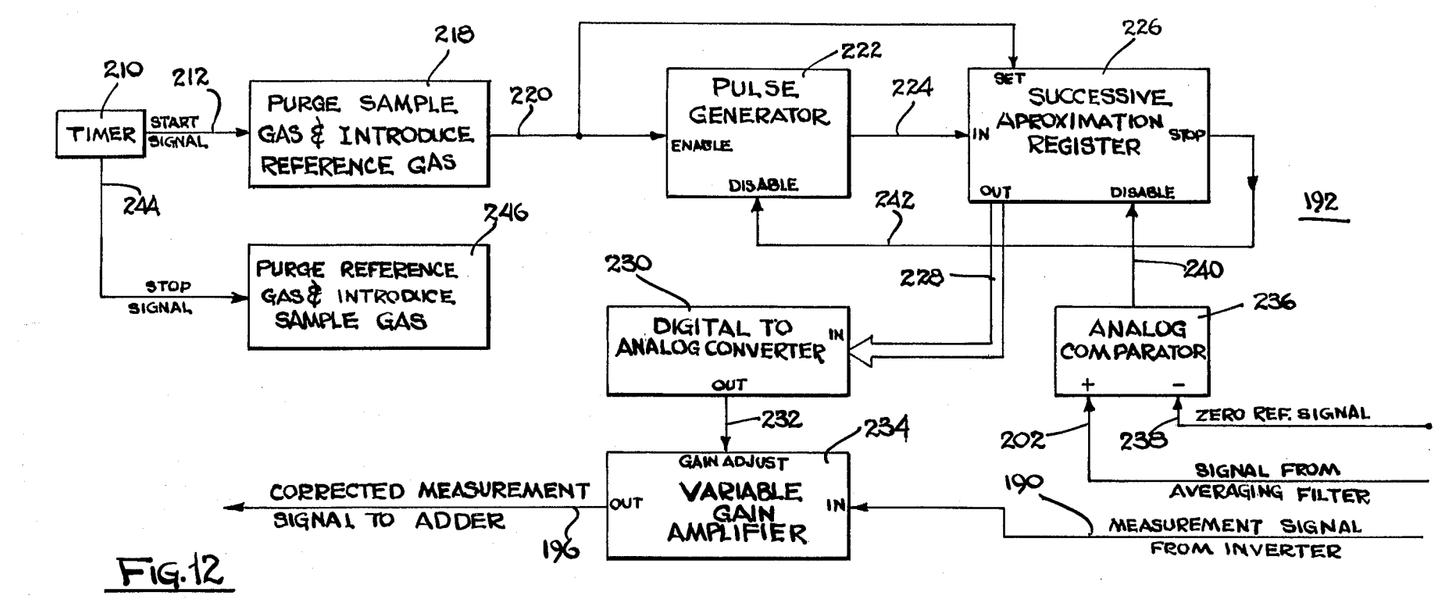
FIG. 12 is a block diagram of the automatic zeroing portion of the electronic control system shown in FIG. 9.

The automatic zeroing circuit 192, shown in detail in FIG. 12, is designed to periodically and automatically restore the amplitude of the measurement pulses equal to the amplitude of the reference pulses when the cells 50 and 52 contain identical gases. The circuit 192 includes a timer 210 which provides a start signal on line 212 which initiates the automatic zeroing function. In the preferred embodiment, start signal 212 is generated approximately once every three hours. However, this interval of time may be increased or decreased as necessary to provide more or less frequent rezeroing of the analyzer 10.

The start signal appearing on line 212 is used to control electrically operated valves (not shown) used to introduce into the measurement cell 50 in place of the sample gas a reference gas which is identical to the gas within the reference cell 52. This introduction of reference gas is shown as block 218 in FIG. 12.

When the reference gas has been introduced into the measurement cell 50, a signal appears on line 220 which enables a pulse generator 222 to produce a continuous series of pulses on line 224. These pulses are provided as an input signal to a twelve bit digital successive approximation register 226. The signal appearing on the line 220 is also used to set the states of the output buffers in the register 226. The signal 220 sets these output buffers so that a digital signal appears on the lines 228 which represents the largest binary number available from the register 226. This binary number is provided as an input signal to a digital-to-analog converter 230 which converts the binary number appearing on the lines 228 to an equivalent analog signal which appears on line 232. The signal on the line 232 is in turn provided as a gain adjust signal to a variable gain amplifier 234. The amplifier 234 receives its input signal from the line 190 of FIG. 9 and provides an output signal on the line 196 of FIG. 9. The signal appearing on the line 190 is the waveform 188 representing the measurement pulses from inverter 186. The signal appearing on the line 196 is the waveform 194 representing the measurement pulses corrected in amplitude to be equal to the amplitude of the reference pulses in the waveform 176. In summary, the amplitude of the measurement pulses appearing in the waveform 194 is proportional to the magnitude of the binary number appearing on the lines 228.

Returning to FIG. 12, with the signal appearing on the lines 228 set to a large binary number, the digital-to-analog converter 230 provides a large analog signal 232 which in turn causes the amplifier 234 to operate near maximum gain. Thus, the signal appearing on the line 190 is amplified to the point that the signal appearing on the line 196 is much greater in amplitude than the reference signal appearing on the line 178 in FIG. 9. Accordingly, the output signal on the line 198 from the adder 184 will be negative in polarity as will the signal appearing on the line 202 from the circuit 200.

The signal appearing on the line 202 is provided as a positive input signal to an analog comparator 236 shown in FIG. 12. A zero reference signal appearing on line 238 is provided as a negative input signal to the comparator 236. Thus, whenever the signal on the line 202 is positive in amplitude, the analog comparator will provide a positive signal on line 240; if the signal appearing on the line 202 is of negative polarity, the comparator 236 will provide a negative signal on the line 240; and if the signal appearing on the line 202 is zero, the comparator 236 will provide a zero signal on the line 240.

The signal appearing on the line 240 is provided as a disable signal to the successive approximation register 226. Whenever the signal appearing on the line 240 is positive or zero, the register 226 is disabled. Under this condition, the register 226 stores in its output buffers the last binary number provided by the register 226 and this binary number appears on the output lines 228. Whenever the signal on the line 240 is negative, the register 226 is no longer disabled and will provide a binary output signal on the line 228 in response to each pulse provided by the pulse generator 222 on the line 224.

As described above, the output signal on the lines 228 from the register 226 is initially set to a large binary number which in turn results in the sample measurement appearing on the line 196 being amplified greatly in excess of the amplitude of the reference pulses appearing in the waveform 176. Accordingly, the output signal appearing on the line 202 from the circuit 200 is negative in polarity. This output signal, which appears as a negative input signal to the comparator 236, causes the signal on the line 240 to be negative. This condition in turn allows the register 226 to provide binary output signals on the line 228 in response to pulses from the generator 222. In the preferred embodiment, the generator 222 is set to produce a pulse at approximately ten second intervals.

When a pulse is provided on the line 224, the register 226 begins counting downward, lowering the magnitude of the binary number appearing on the lines 228. This in turn lowers the amplitude of the measurement pulses appearing on the line 196, which reduces the amplitude of the signal appearing on the line 202 from the filter 200. In the preferred embodiment, the filter 200 has a settling time of approximately five seconds. Therefore, the output signal from the filter 200 will have settled to a steady state value before the next pulse is generated by the generator 222.

The above described series of events continue for several successive pulses from the generator 222 with the register 226 successively reducing the magnitude of the binary number appearing on the lines 228. Eventually, this binary number will be reduced to the point where the amplitude of the measurement pulses in the waveform 194 is substantially equal to the amplitude of the reference pulses in the waveform 176. When this event occurs, the signal appearing on the line 240 from the comparator 236 switches from a negative signal to a positive signal. At this point, the register 226 is disabled and the binary number appearing on the lines 228 remains stored in the output buffers of the register 226. This stored binary number represents the proper setting of the gain of the amplifier 234 to cause the amplitude of the measurement pulses in the waveform 194 to be substantially equal to the amplitude of the reference pulses appearing in the waveform 176.

In the preferred embodiment, the automatic zeroing process described above takes approximately five minutes to complete. The Register 226 is set to provide a stop signal on line 242 after a sufficient time has elapsed to allow the automatic zeroing process to be completed. The stop signal is provided as a disable signal to the generator 222, preventing any further pulses from appearing on the line 224. When this event is completed, a stop signal 244 is provided to a block 246 from the timer 210 to actuate the electrically operated valves to reintroduce the sample gas into the sample cell 50. At this point the entire automatic zeroing function is complete and the analyzer 10 is returned to its intended function.

In addition to the features described above, the analyzer 10 of the present invention includes several other features designed to minimize measurement error. For example, to eliminate measurement errors due to variations in ambient temperature, the analyzer 10 employs the heating element 120 in combination with the insulation 122 to maintain the temperature of the gases within the cells 50 and 52 at a predetermined constant level. This is important because the infrared absorption characteristics of a gas are a function of the temperature of that gas. Further, the housing 102 for the detector 112 is constructed of a material having a low coefficient of thermal conductivity, such as plastic, to minimize the effects of external temperature variations on the performance of the detector 112.

While the invention is disclosed and a particular embodiment is described in detail, it is not intended that the invention be limited solely to this embodiment. Many modifications will occur to those skilled in the art which are within the spirit and scope of the invention. It is thus intended that the invention be limited in scope only by the appended claims.

What is claimed is:

1. A gas analyzer comprising:
radiation generating means for providing a directed beam of radiation;
a generally cylindrical reference cell for containing a reference gas and having first and second ends;
a generally cylindrical measurement cell for containing a sample gas to be analyzed and having first and second ends and an inner diameter substantially equal to the inner diameter of the reference cell;
interrupter means for interrupting the directed beam to provide first and second sequentially pulsed beams, including a disk rotated about its center and having a plurality of circumferentially spaced apart generally arcuate shaped outer apertures for generating the second pulsed beam and a plurality of circumferentially spaced apart generally arcuate shaped inner apertures for generating the first pulsed beam;
first and second baffles each having a first circular aperture substantially equal to the inner diameter of the reference cell and a second circular reducing aperture having a diameter less than the inner diameter of the reference cell;
radiation detection means for measuring the radiation from the two sequentially pulsed beams of radiation; and
means for positioning the radiation generating means, the interrupter means, the first and second baffles, the reference and measurement cells and the radiation detection means so that rotation of the disk in cooperation with its inner and outer apertures interrupts the directed beam to produce the first and second sequentially pulsed beams, respectively, which are directed axially through the second and first circular apertures, respectively, of the first baffle, and then through the first ends of the reference and cells respectively, and so that the radiation beams subsequentially emanating from the second ends of the reference and measurement cells are axially directed through the first and second circular apertures, respectively, of the second baffle, and then to the detection means.

2. A gas analyzer comprising:
radiation generating means for providing a directed beam of radiation;
a generally cylindrical reference cell for containing a reference gas and having first and second ends;
a generally cylindrical measurement cell for containing a sample gas to be analyzed and having first and second ends and an inner diameter substantially equal to the inner diameter of the reference cell;
interrupter means for interrupting the directed beam to provide first and second sequentially pulsed beams, including a disk rotated about its center and having a plurality of circumferentially spaced apart generally arcuate shaped outer apertures for generating the second pulsed beam, the center of each outer aperture positioned at a first radius from the disk center where the length across the center of each outer aperture is an integer multiple of the inner diameter of the reference cell and subtends a first central angle of the disk, and the width of each outer aperture is substantially equal to the inner diameter of the reference cell, and a plurality of circumferentially spaced apart generally arcuate shaped inner apertures for generating the first pulsed beam, the center of each inner aperture positioned at a second radius from the disk center which is less than the first radius where the length of each inner aperture subtends the first central angle of the disk and the width of each inner aperture is substantially equal to the width of each outer aperture;
first and second baffles each having a first circular aperture having a diameter substantially equal to the inner diameter of the reference cell and a second circular reducing aperture having a diameter substantially equal to the inner diameter of the reference cell multiplied by the ratio of the second radius to the first radius;
radiation detection means for measuring the radiation from the two sequentially pulsed beams of radiation; and
means for positioning the radiation generating means, the interrupter means, the first and second baffles, the reference and measurement cells and the radiation detection means so that rotation of the disk in cooperation with its inner and outer apertures interrupts the directed beam to produce the first and second sequentially pulsed beams, respectively, which are directed axially through the second and first circular apertures, respectively, of the first baffle, and then through the first ends of the reference and measurement cells respectively, and so that the radiation beams subsequentially emanating from the second ends of the reference and measurement cells are axially directed through the first and second circular apertures, respectively, of the second baffle, and then to the detection means.

3. The analyzer of claim 2 in which the length of each outer aperture is equal to twice the inner diameter of the reference cell.

4. The analyzer of claims 1 or 2 further including means for heating the reference and measurement cells to a predetermined temperature level.

5. The analyzer of claims 1 or 2 in which the detection means provides a detection signal including reference pulses alternating with measurement pulses where each reference pulse is in response to the first pulsed beam and each measurement pulse is in response to the second pulsed beam, and further including:

phase splitter means responsive to the detection signal for separating the detection signal into a reference signal comprising only the reference pulses and a measurement signal comprising only the measurement pulses;

difference means responsive to the reference and measurement signals for providing a difference signal equal to the difference between the reference signal and the measurement signal; and filter means responsive to the difference signal for producing a steady state signal proportional to the average difference between the reference and measurement signals.

6. The analyzer of claim 5 further including automatic zero setting means responsive to the measurement signal and the steady state signal for automatically adjusting the amplitude of the measurement pulses to be equal to the amplitude of the reference pulses when the measurement and reference cells both contain identical gases.

7. The analyzer of claim 5 in which the automatic zero setting means includes:

means for introducing the reference gas into the measurement cell;

comparison means responsive to the steady state signal for producing a comparison signal equal to the difference between the steady state signal and a zero reference signal;

gain adjusting means responsive to the comparison signal and the measurement signal for providing a gain signal which affects the amplitude of the measurement pulses in a mannner which causes the comparison signal to be reduced to zero; and storage means for storing the gain signal when the comparison signal is reduced to zero.

8. The analyzer of claim 7 in which the zero setting means further includes:

means for introducing the sample gas into the measurement cell.

* * * * *